(12) United States Patent
Yang et al.

(10) Patent No.: US 11,959,857 B2
(45) Date of Patent: Apr. 16, 2024

(54) APPARATUS FOR MEASURING RAMAN SCATTERING, AND APPARATUS AND METHOD FOR DETERMINING TRUE FIRE USING THE APPARATUS

(71) Applicant: ELECTRONICS AND TELECOMMUNICATIONS RESEARCH INSTITUTE, Daejeon (KR)

(72) Inventors: Hoe Sung Yang, Daejeon (KR); Soo Cheol Kim, Daejeon (KR); Hyun Seok Kim, Daejeon (KR); Sang Hyun Mo, Daejeon (KR); So Young Park, Daejeon (KR); Kang Bok Lee, Daejeon (KR); Kyu Won Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 272 days.

(21) Appl. No.: 17/478,727

(22) Filed: Sep. 17, 2021

(65) Prior Publication Data
US 2022/0099579 A1  Mar. 31, 2022

(30) Foreign Application Priority Data

Sep. 25, 2020 (KR) .................. 10-2020-0125067
Aug. 9, 2021 (KR) .................. 10-2021-0104761

(51) Int. Cl.
*G08B 17/10* (2006.01)
*G01N 21/53* (2006.01)
(Continued)

(52) U.S. Cl.
CPC ............. *G01N 21/65* (2013.01); *G01N 21/53* (2013.01); *G01N 2021/3166* (2013.01); *G01N 2201/06113* (2013.01)

(58) Field of Classification Search
CPC ............. G01N 21/65; G01N 21/53; G01N 2021/3166; G01N 2201/06113
See application file for complete search history.

(56) References Cited

U.S. PATENT DOCUMENTS 9,030,916 B2  5/2015  Park et al.
9,092,959 B2  7/2015  Kim et al.
(Continued)

FOREIGN PATENT DOCUMENTS

JP    2000-180259 A      6/2000
JP    2013136009 A  *   7/2013  ............. B01D 39/14
(Continued)

*Primary Examiner* — Toan N Pham
(74) *Attorney, Agent, or Firm* — LRK PATENT LAW FIRM

(57) ABSTRACT

Provided is a Raman scattering measurement apparatus including a light source which emits light to smoke particles, a filter configured to block light which is incident to the smoke particles and passes through the particle and to allow Raman scattered light to pass therethrough, and a photodetector which detects the Raman scattered light passing through the filter in order to distinguish fire smoke generated due to a true fire from non-fire smoke generated due to daily life or industrial activity. The present invention also provides a fire determination apparatus including a unit which reads a Raman shift from Raman scattered light detected by the photodetector of the Raman scattering measurement apparatus, estimates a smoke component from the read Raman shift, and determines fire/non-fire from the estimated smoke component and a method thereof.

12 Claims, 6 Drawing Sheets

(51) Int. Cl.
*G01N 21/65* (2006.01)
*G01N 21/31* (2006.01)

(56) References Cited

U.S. PATENT DOCUMENTS

| | | | |
|---|---|---|---|
| 10,054,542 B2 | 8/2018 | Iguchi et al. | |
| 11,016,280 B1 * | 5/2021 | Pan | G01N 15/1436 |
| 2014/0004559 A1 * | 1/2014 | Hill | G01N 21/01 356/300 |
| 2021/0208078 A1 * | 7/2021 | Birnkrant | G08B 17/107 |

FOREIGN PATENT DOCUMENTS

| | | |
|---|---|---|
| KR | 10-1165821 B1 | 7/2012 |
| KR | 10-1568634 B1 | 11/2015 |
| KR | 10-1720410 B1 | 3/2017 |
| KR | 10-1753873 B1 | 7/2017 |
| KR | 10-1784474 B1 | 10/2017 |
| KR | 20-0485250 B1 | 12/2017 |
| KR | 10-1863270 B1 | 6/2018 |
| KR | 10-1874970 B1 | 7/2018 |
| KR | 101905516 B1 * | 10/2018 ............... G01J 3/44 |
| KR | 10-1963111 B1 | 7/2019 |
| KR | 10-1995138 B1 | 7/2019 |

\* cited by examiner

APPARATUS FOR MEASURING RAMAN SCATTERING, AND APPARATUS AND METHOD FOR DETERMINING TRUE FIRE USING THE APPARATUS

CROSS-REFERENCE TO RELATED APPLICATIONS

This application claims priority to and the benefit of Korean Patent Applications No. 10-2020-0125067, filed on Sep. 25, 2020, and No. 10-2021-0104761, filed on Aug. 9, 2021, the disclosure of which is incorporated herein by reference in its entirety.

BACKGROUND

1. Field of the Invention

The present invention relates to a technique of measuring components of smoke on the basis of light spectrum analysis, and to a technique of distinguishing fire smoke generated from a true fire from non-fire smoke generated from daily life or industrial activities.

2. Description of Related Art

A fire detector is a fire protection apparatus which detects fire by recognizing heat or smoke generated when the fire occurs, and the fire detector automatically detects fire and issues a fire alarm when the fire occurs. Fire detectors include heat detectors, smoke detectors, complex detectors, flame detectors, and the like.

The heat detectors are divided into differential types, which determine occurrence of fire when a temperature rises rapidly; constant types, which determine occurrence of fire when a temperature rises to a level higher than or equal to a predetermined temperature; and compensation types (including spot types and distribution types divided according to a detection range), which serve as both of the differential types and the constant types. The smoke detectors, which operate when detecting smoke generated when fire occurs, include ionization types, which use a change in an ion current when smoke is introduced into a detection unit; and photoelectric types, which use a change in incident light intensity when smoke is introduced into a detection unit. The heat and smoke complex detectors have a compensation type heat detection function and a photoelectric type smoke detection function to detect heat and smoke at the same time. In addition, the flame detectors, which operate when a change in flame is greater than or equal to a predetermined amount, operate when an amount of light received by a light-receiving element is changed by a flame of one location. The flame detectors include ultraviolet types, infrared types, ultraviolet/infrared combined types, and complex types.

Such a fire detector is installed by attaching a base to a ceiling, a wall, or the like and assembling a detection unit formed as a circuit including elements onto the base in order to detect fire in a house or a building. When fire occurs, a fire detector detects flame, smoke, temperature, or the like and sends a signal to an external device to issue an alarm.

However, since the conventional smoke detection type fire detector determines whether particles are present on the basis of sizes of smoke particles, there is a problem in that a non-fire alarm is frequently issued by the fire detector being operated by determining non-fire as fire even in a case in which particles, such as water vapor, cigarette smoke, cooking smoke, fine dust, and by-products generated from daily life or industrial activities, which are similar to particles of fire smoke, are generated.

SUMMARY OF THE INVENTION

The present invention is directed to solving a problem in that, due to heat generated in daily life and smoke, such as cigarette smoke, cooking smoke, fine dust, and by-products, generated from daily life or industrial activities, a non-fire alarm is frequently issued when non-fire is determined as fire. Accordingly, the present invention is directed to reducing the number of times that a non-fire alarm is issued by distinguishing fire smoke generated due to a true fire from non-fire smoke generated due to daily life or industrial activity.

According to one aspect of the present invention, there is provided a Raman scattering measurement apparatus including a light source which emits light to smoke particles, a filter configured to block light which is incident to the smoke particles and passes through the particle and to allow Raman scattered light to pass therethrough, and a photodetector which detects the Raman scattered light passing through the filter.

According to another aspect of the present invention, there is provided a fire determination apparatus including a light source which emits light to smoke, a filter configured to block light which is emitted and passes through smoke particles, and allow Raman scattered light to pass therethrough, a photodetector which detects the light passing through the filter, and a unit which reads a Raman shift from the detected light, estimates a smoke component from the read Raman shift, and determines fire/non-fire from the estimated smoke component.

According to still another aspect of the present invention, there is provided a method of determining fire comprising emitting light to smoke, performing filtering for blocking light passing through smoke particles and allowing Raman scattered light to pass, detecting the filtered light, reading a Raman shift from the detected light, estimating a smoke component from the read Raman shift, and determining fire/non-fire from the estimated smoke component.

The configuration and operation of the present invention will be clearer through specific embodiments described with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood with reference to the following exemplary embodiments described in detail with the accompanying drawings. However, the present invention is not limited to the embodiments to be disclosed below and may be implemented in various different forms. The embodiments are provided only in order to fully describe the present invention and fully notify the scope of the present invention to those skilled in the art, and the scope of the present invention is defined by the appended claims. In addition, the terms used herein are provided only to describe the embodiments of the present invention and are not for purposes of limitation. Unless the context clearly indicates otherwise, the singular forms described in the specification include the plural forms. In addition, the terms "comprise," "comprising," or the like used herein are used as a meaning of specifying some stated components, steps, operations and/or elements, but do not preclude the presence or addition of one or more other components, steps, operations and/or elements. Hereinafter, the exemplary embodiments of the present invention will be described in detail with reference to the accompanying drawings. When the embodiments are described, in a case in which specific descriptions of related known components or functions obscure the gist of the present invention, the specific descriptions will be omitted.

Figure 1:
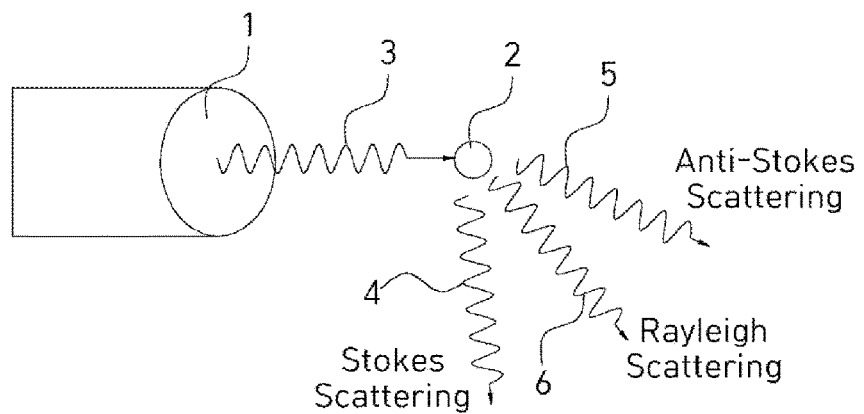
FIG. 1 is a schematic conceptual view for describing Raman scattering.

FIG. 1 is a schematic conceptual view for describing Raman scattering. When intensive light 3, which has a single wavelength and emits from a light source 1 (a laser or the like), is radiated to a gas, a liquid, or a solid material 2, Stokes scattering 4 having a wavelength slightly longer than a wavelength of incident light, anti-Stokes scattering 5 having a wavelength shorter than the wavelength of the incident light, and Rayleigh scattering 6 are observed in addition to light which is included in scattered light scattered by material particles and has a wavelength which is the same as the wavelength of the incident light. Such a phenomenon is referred to as Raman scattering. When a material receives light energy, some energy is used as energy for vibration of atoms constituting the material or rotation of molecules, and when the remaining energy is scattered as light, light having a long wavelength is mixed in scattered light so that Stokes scattering occurs. Conversely, when energy in the material is applied to light energy, a wavelength of scattered light decreases so that anti-Stokes scattering occurs.

Figure 2A:
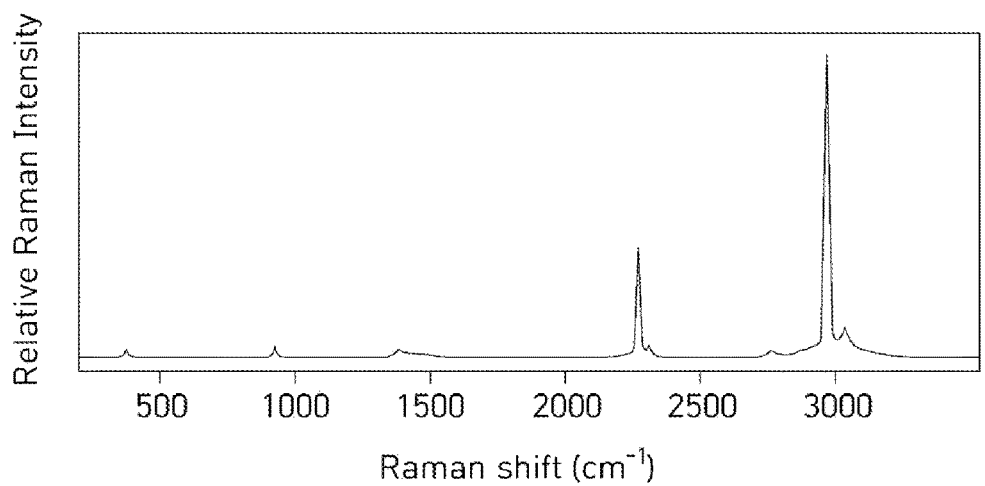
FIGS. 2A-2D show example graphs showing that Raman shifts are different according to materials.
Figure 2B:
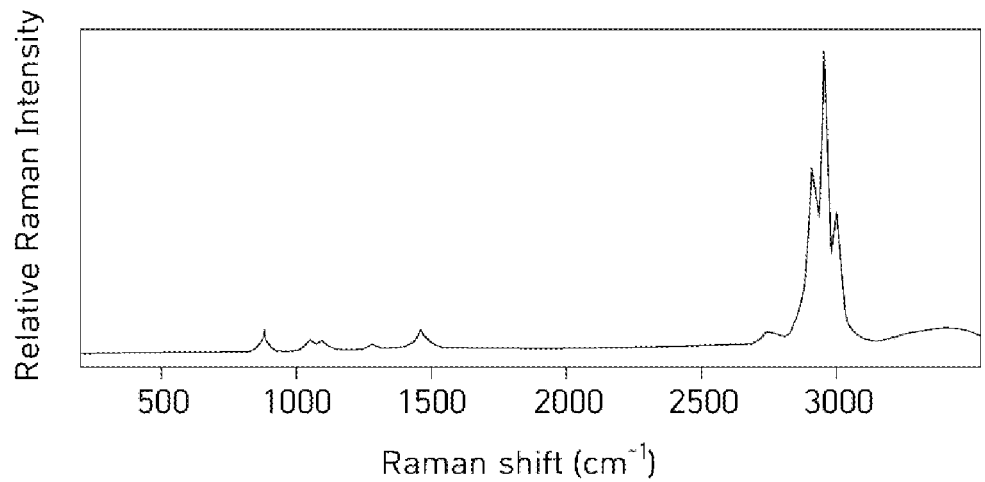
Figure 2C:
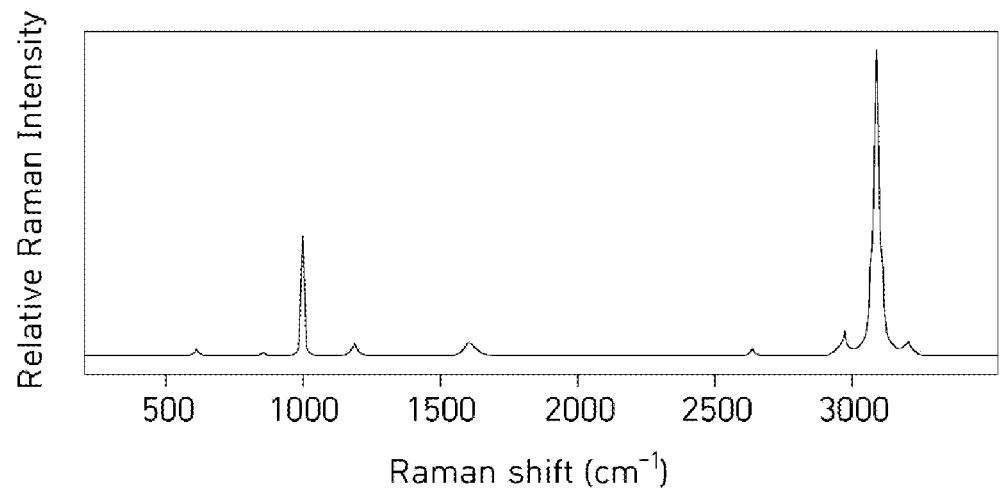
Figure 2D:
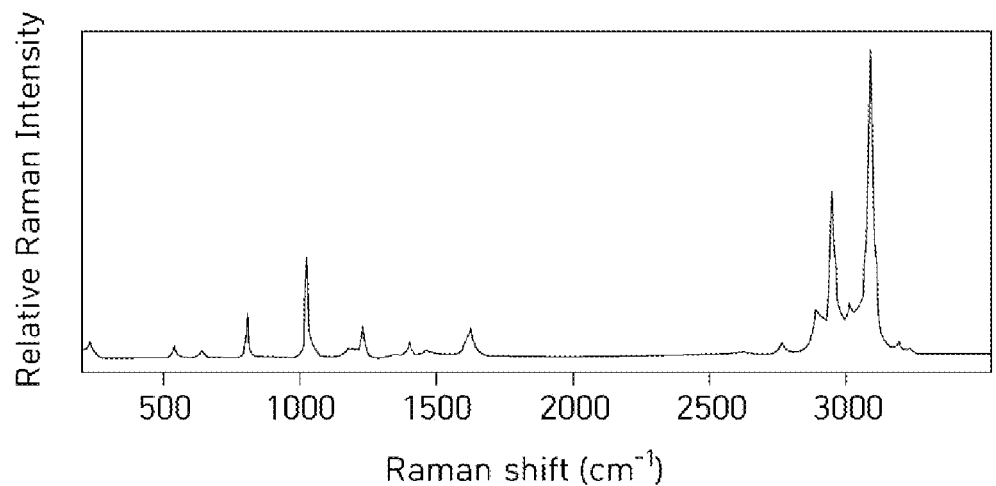

A molecular structure, quality/quantity of a material, and the like can be analyzed by measuring a spectrum generated due to Raman scattering. A pattern in which a scattered light spectrum generated while Raman scattering occurs is shifted with respect to Rayleigh Scattering is referred to as a Raman Shift. The Raman shift occurs differently according to a material. FIG. 2 illustrates that Raman shifts ($cm^{-1}$) occur in different forms for each material. FIG. 2A shows a Raman shift in acetonitrile, FIG. 2B shows Raman shift in ethanol, FIG. 2C shows a Raman shift in benzene, and FIG. 2D shows Raman shift in toluene.

Using a phenomenon in which a Raman shift occurring due to Raman scattering is different according to a material as described, a Raman shift is determined from Raman scattered light measured for a smoke particle material to analyze a kind of smoke so as to determine whether the smoke is fire smoke generated due to fire or non-fire smoke generated during daily life or an industrial activity. However, since the scattered light generated due to an effect of Raman scattering is weak when compared to an intensity of a laser light emitted to the smoke particle material, it is not easy to observe the Raman scattering. Then, the present invention proposes a Raman scattering measurement apparatus formed as follows.

Figure 3:
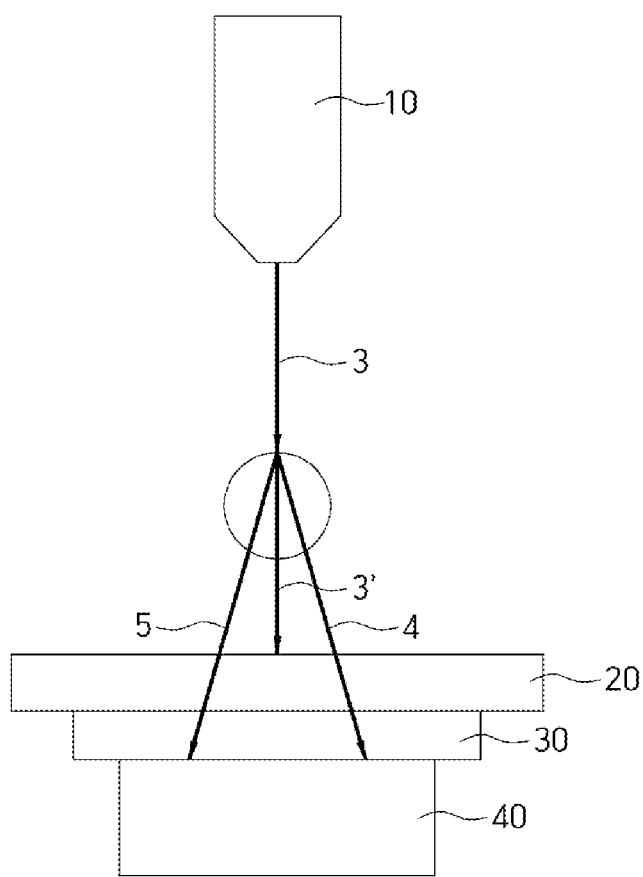
FIG. 3 is a block diagram illustrating an apparatus for measuring Raman scattered light with respect to smoke particles, wherein the apparatus is used to analyze smoke components according to one embodiment of the present invention.

FIG. 3 is a block diagram illustrating an apparatus for measuring Raman scattered light with respect to smoke particles to determine fire/non-fire according to one embodiment.

A Raman scattering measurement apparatus illustrated in FIG. 3 includes a light source 10, an optical filter 20, a nanoimprint filter 30, and a photodetector 40. The apparatus may be employed in a fire detector installed inside or outside a building.

The light source 10, which emits, for example, laser light to smoke generated inside or outside the building, may emit light having a single wavelength, and a plurality of light sources, or a single light source, which are configured to emit light having a plurality of wavelengths, may also be used to emit light having one or more wavelengths. As the plurality of wavelengths, for example, wavelengths of about 532±10% (≈478 to 586) nm, 785±10% (≈706 to 864) nm, 830±10% (≈747 to 913) nm, 1064±10% (≈957 to 1171) nm may be used. However, according to a kind of a smoke particle material to be measured, a light source for emitting light in a wavelength band excluding the wavelengths described above may also be used. For example, among a place in which ethanol is mainly handled, a place in which benzene is mainly handled, a general household, and the like, a kind of a smoke particle material may be changed according to a place in which the fire detector employing the present apparatus is installed, and a wavelength of light emitted by the light source 10 may be applied to be different according to the place.

The optical filter 20 is configured to block light 3' in a wavelength band, which is emitted to smoke particles 2 and passes through the particles, and to allow only a wavelength band including Raman scattered light, that is, Stokes scattering 4 or/and anti-Stokes scattering 5, to pass therethrough. The optical filter 20 may be designed as one of a low pass filter, a high pass filter, and a bandpass filter, and in each case, a wavelength filtering parameter may be designed to correspond to a kind of a smoke particle material which may be changed according to a place in which the fire detector employing the present apparatus is installed like the light source 10. This will be described in detail below.

The nanoimprint filter 30 allows the Raman scattered light filtered by the optical filter 20 to pass therethrough by limiting a range of a wavelength of the Raman scattered light to correspond to a detection characteristic of the photodetector 40 so that the photodetector 40 may detect the Raman scattered light with maximum efficiency. That is, the nanoimprint filter 30 serves to decrease a permissible wavelength range of a detection sensor constituting the photodetector 40 and to improve sensitivity. The nanoimprint filter includes a plurality of nano structures formed through a 100 nm or less semiconductor nano process and has a characteristic of allowing light of a specific wavelength to pass therethrough by combining wavelengths of light, which passes through the nano structures, of light sources. The nanoimprint filter 30 may be formed to be included in the photodetector 40 but is not limited thereto.

In this case, since the filtering by the optical filter 20 serves to filter the Raman scattered light within a wide range to roughly correspond to a kind of a smoke particle material which is changed according to a place and the filtering by the nanoimprint filter 30 serves to decrease a permissible wavelength range so that the Raman scattered light primarily filtered by the optical filter 20 within the wide range corresponds to the characteristic of the photodetector 40 and serves to improve sensitivity, the former may be referred to as first filtering, and the latter may be referred to as second filtering.

Figure 4A:
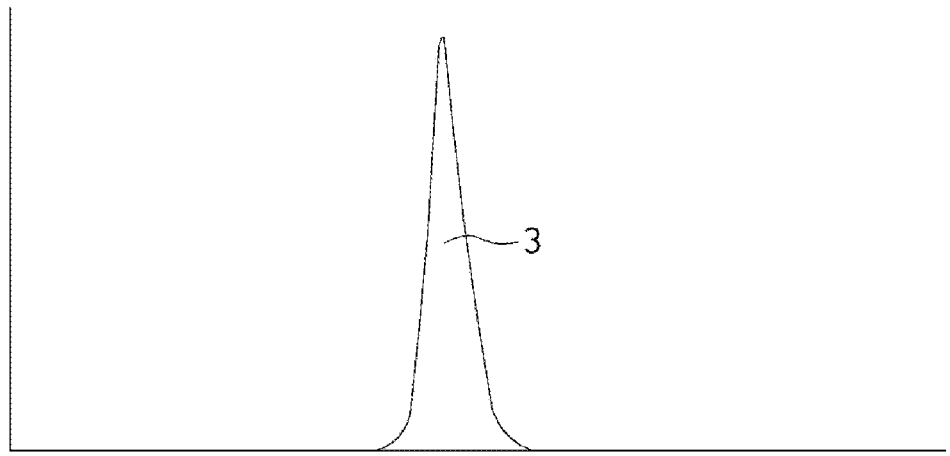
FIGS. 4A-4E show graphs showing wavelength-intensity relationships for describing a filtering operation of an optical filter (20) and a nanoimprint filter (30) used in the Raman scattering measurement apparatus of FIG. 3.
Figure 4B:
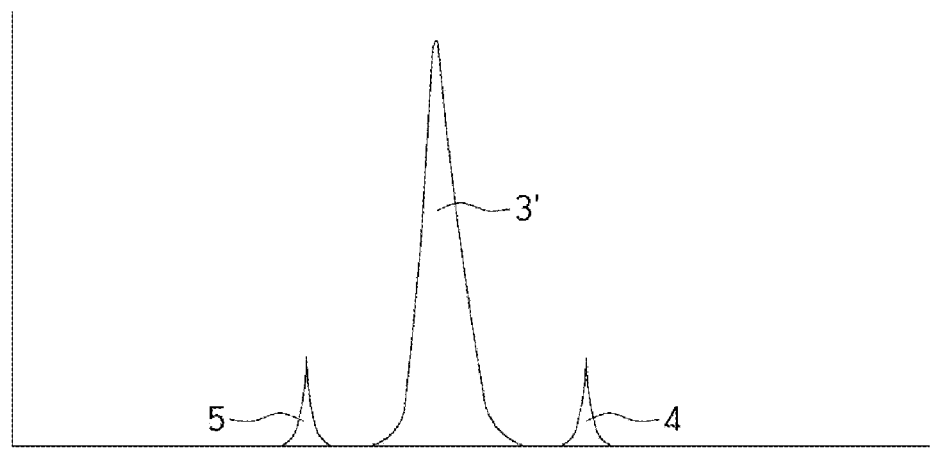
Figure 4C:
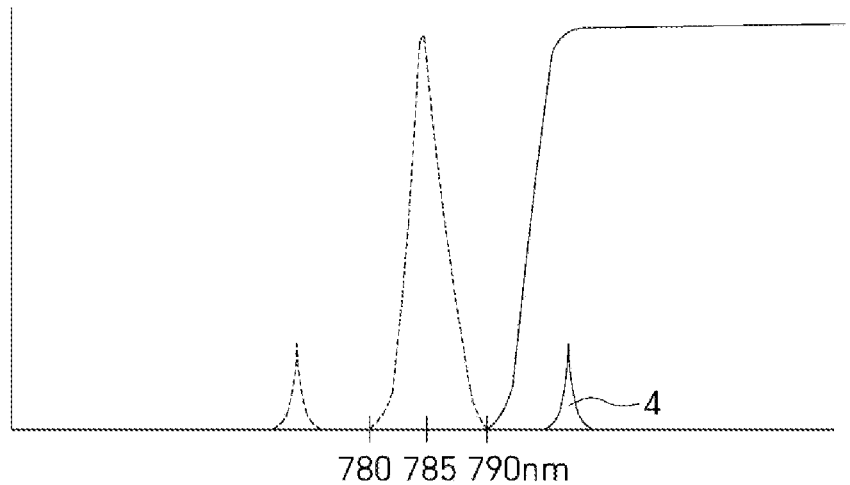
Figure 4D:
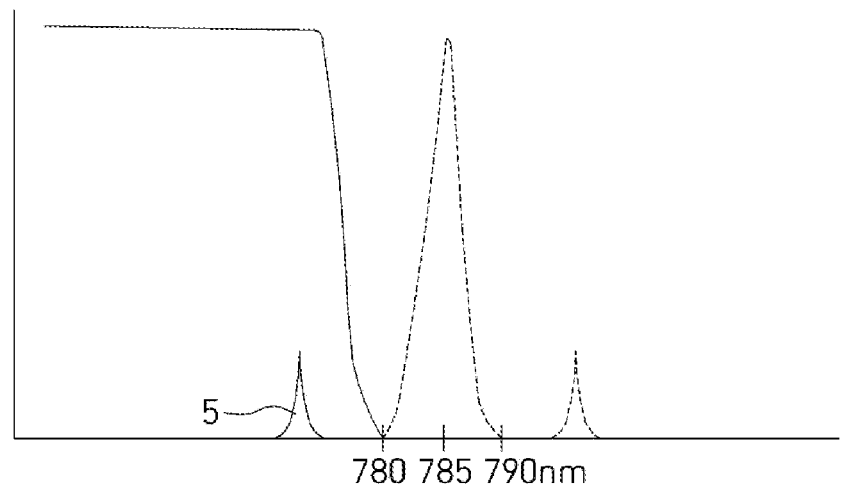
Figure 4E:
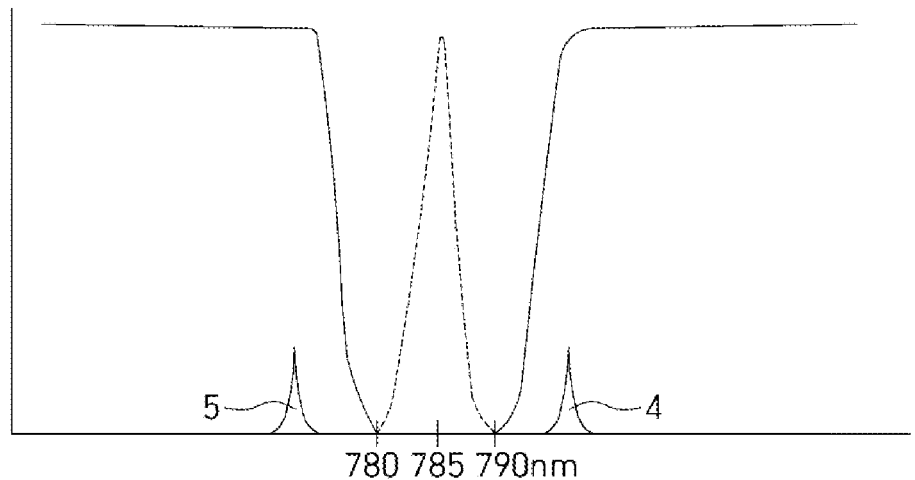

Then, various examples about a wavelength of the light source of the apparatus, which is formed as in FIG. 3, configured to measure Raman scattered light by smoke particles and a filtering wavelength will be illustrated. The following description will be performed with reference to FIGS. 4A-4E. FIGS. 4A-4E show wavelength versus intensity relationships (response characteristics in a frequency range) for describing a filtering function performed by the optical filter 20 and the nanoimprint filter 30. FIG. 4A shows a response characteristic in a frequency range of the light 3 emitted from the laser light source 10. FIG. 4B shows a response characteristic of the light 3', which is light emitted and passing through the smoke particle, and Raman scattered light scattered by the smoke particle, that is, in a frequency range of Stokes scattering 4 and anti-Stokes scattering 5. FIGS. 4C, 4D, and 4E show response characteristics in a frequency range of light filtered by the optical filter 20 and will be described in detail below.

First, in the case of an example in which the laser light source 10 of the Raman scattering measurement apparatus installed in the fire detector is set to emit light of a single wavelength of about 785 nm, and the photodetector 40 is set to detect a band of about 800 to 100 nm, the optical filter 20 may be provided as a high pass filter which blocks an occupied band (for example, 780 to 790 nm) of 785 nm which is the wavelength of light of the light source or less and allows a band higher than the occupied band to pass therethrough to remove light 3' passing through smoke and anti-Stokes scattering 5 (see FIG. 4C). In this case, the photodetector 40 may detect Stokes Scattering of about 20 to 2700 $cm^{-1}$.

In addition, in the case of an example in which the laser light source 10 in the Raman scattering measurement apparatus is set to emit light of the same wavelength and the photodetector 40 is set to detect light of a wavelength in a band of about 650 to 770 nm, the optical filter 20 may be provided as a low pass filter which blocks light in a band greater than or equal to an occupied band of 785 nm which is the wavelength of light of the light source and allows light in a band lower than the occupied band to remove light 3' passing through smoke and Stokes scattering 4 (see FIG. 4D). In this case, the photodetector 40 may measure anti-Stokes scattering of about 20 to 2700 $cm^{-1}$.

In addition, in the case of an example in which the laser light source 10 in the Raman scattering measurement apparatus is set to emit light of the same wavelength and the photodetector 40 is set to detect light in a wavelength band of about 650 to 770 nm and a wavelength band of about 800 to 100 nm, the optical filter 20 may be provided as a band stop filter which blocks light in an occupied band of 785 nm which is the wavelength of the light source and allows light of other wavelengths (for example, a wavelength less than 780 nm or greater than 790 nm) to pass therethrough to remove only light 3' passing through smoke (see FIG. 4E). In this case, the photodetector 40 may measure all of Stokes scattering and anti-Stokes scattering of about 20 to 2700 $cm^{-1}$.

The examples are to facilitate understanding of the Raman scattering measurement apparatus having various specifications in which the laser light source 10, the optical filter 20, the photodetector 40, and the nanoimprint filter 30 are set to operate in a wavelength band corresponding to particle materials constituting smoke to be generated. That is, an emission wavelength of the laser light source 10, a wavelength of passing and blocking bands of the optical filter 20, and a detection wavelength of the photodetector 40 including/excluding the nanoimprint filter 30 may be set to be different according to an installation place of the fire detector employing the Raman scattering measurement apparatus or intention of the user.

Figure 5:
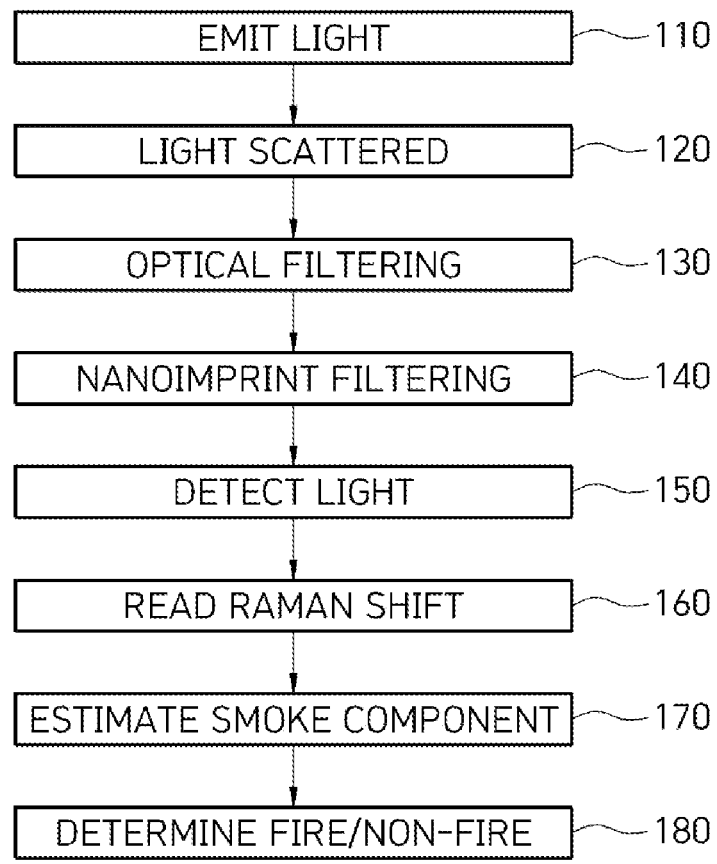
FIG. 5 is a block diagram of a method and the apparatus according to the present invention which determines fire/non-fire by analyzing smoke components from measured data of the Raman scattered light with respect to the smoke particles.

FIG. 5 is a block diagram of a method and the apparatus according to the present invention which determines fire/non-fire by analyzing smoke components from data, which is measured by the Raman scattering measurement apparatus, of the Raman scattered light with respect to smoke particles. Content overlapping that described above will be omitted.

First, when the Raman scattering measurement apparatus emits light, the emitted light is emitted to smoke particles (110).

Scattered light (Raman effect) is generated by the smoke particles (120).

A first filtering, that is, optical filtering, is performed on Raman scattered light (130). The optical filter used in this case is designed to block light passing through the smoke particles and to allow only the Raman scattered light in a set wavelength band to pass therethrough as described above.

The photodetector detects light passing through the optical filter (150). Before the light is detected, nanoimprint filtering (140) may be performed. The nanoimprint filtering 140 serves to decrease a permissible wavelength range of the detection sensor constituting the photodetector and improve sensitivity by limiting a range of a wavelength when the photodetector detects the Raman scattered light.

A Raman shift is read from the detected light (Raman scattering measurement data) (160). The Raman shift has been described with reference to FIG. 2.

Smoke components are estimated from the read Raman shift (170). Since the Raman shift is a characteristic of a material, Raman shift data for various materials has been accumulated. The materials constituting the smoke may be estimated using the data.

From the estimated smoke components, it is determined whether the smoke is smoke caused by fire or smoke according to daily life or an industrial activity so that fire/non-fire is determined (180).

In this case, the read of the Raman shift from the Raman scattering measurement data, the estimation of the smoke components from the read Raman shift, and the determination of the fire/non-fire from the estimated smoke components may be performed by at least one of a digital signal processor (DSP), a processor, a controller, an application-specific integrated circuit (ASIC), a programmable logic element (field programmable gate array (FPGA) or the like), and other electronic elements and a hardware element including a combination thereof. In addition, the operations may be coupled to a hardware element or performed by independent software, and the software may be stored in a recording medium and executed or moved.

According to the present invention, since Raman scattered light with respect to particles of smoke caused by a certain reason is measured to analyze a Raman shift so as to determine components of the smoke, whether the smoke is fire smoke or non-fire smoke can be distinguished, and thus the number of times that a non-fire alarm is issued by the fire detector operating and non-fire is determined as fire can be reduced.

Although the present invention has been described in detail through the exemplary embodiments, it will be understood by those skilled in the art that the invention may be performed in concrete forms different from the content disclosed in the present specification without changing the technological scope and essential features. The above-described embodiments should be considered as only examples in all aspects and not for purposes of limitation. In addition, it should be interpreted that the scope of the present invention is defined not by the detailed description but by the appended claims and encompasses all modifications and alterations derived from the scope and equivalents of the appended claims.

What is claimed is:

1. A Raman scattering measurement apparatus comprising:
   a light source which emits light to smoke particles;
   a filter configured to block light which is incident to the smoke particles and passes through the particles, and to allow Raman scattered light to pass therethrough;
   a nanoimprint filter configured to secondarily filter the Raman scattered light passing through the filter and to send the Raman scattered light to the photodetector; and
   a photodetector which detects the Raman scattered light passing through the nanoimprint filter,
   wherein the nanoimprint filter is configured to decrease a predetermined wavelength range of a detection sensor constituting the photodetector by limiting a range of a wavelength of the Raman scattered light to correspond to a detection characteristic of the photodetector.

2. The Raman scattering measurement apparatus of claim 1, wherein the light source includes a laser light source.

3. The Raman scattering measurement apparatus of claim 1, wherein the light source is configured to emit light having at least one wavelength.

4. The Raman scattering measurement apparatus of claim 1, wherein the filter includes an optical filter.

5. A fire determination apparatus comprising:
   a light source which emits light to smoke;
   a filter configured to block light which is emitted and passes through smoke particles, and allow Raman scattered light to pass therethrough;
   a nanoimprint filter configured to secondarily filter the Raman scattered light passing through the filter and to send the Raman scattered light to the photodetector;
   a photodetector which detects the Raman scattered light passing through the nanoimprint filter; and
   a unit, which reads a Raman shift from the detected Raman scattered light, estimates a smoke component from the read Raman shift, and determines fire/non-fire from the estimated smoke component,
   wherein the nanoimprint filter is configured to decrease a predetermined wavelength range of a detection sensor constituting the photodetector by limiting a range of a wavelength of the Raman scattered light to correspond to a detection characteristic of the photodetector.

6. The fire determination apparatus of claim 5, wherein the light source includes a laser light source.

7. The fire determination apparatus of claim 5, wherein the light source is configured to emit light having at least one wavelength.

8. The fire determination apparatus of claim 5, wherein the filter includes an optical filter.

9. A method of determining fire, comprising:
   emitting light to smoke:
   performing filtering for blocking light passing through smoke particles and allowing Raman scattered light to pass;
   secondarily filtering the filtered Raman scattered light:
   detecting the secondarily filtered Raman scattered light;
   reading a Raman shift from the detected Raman scattered light;
   estimating a smoke component from the read Raman shift; and
   determining fire/non-fire from the estimated smoke component,
   wherein the secondary filtering is performed by a nanoimprint filter,
   wherein the nanoimprint filter is configured to decrease a predetermined wavelength range of a detection sensor constituting the photodetector by limiting a range of a wavelength of the Raman scattered light to correspond to a detection characteristic of the photodetector.

10. The method of claim 9, wherein the emitted light is laser light.

11. The method of claim 9, wherein the emitted light has at least one wavelength.

12. The method of claim 9, wherein the filtering is performed by an optical filter.

* * * * *